United States Patent
Van Hillo et al.

(10) Patent No.: US 8,834,237 B2
(45) Date of Patent: Sep. 16, 2014

(54) METHOD AND APPARATUS FOR PROCESSING A POULTRY CARCASS PART

(71) Applicant: Meyn Food Processing Technology B.V., Oostzaan (NL)

(72) Inventors: Eric Adriaan Van Hillo, Oostzaan (NL); Jan Willem Hagendoorn, Oostzaan (NL); Jaco Gardenier, Oostzaan (NL); Eric De Jong, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 13/871,152

(22) Filed: Apr. 26, 2013

(65) Prior Publication Data

US 2013/0288583 A1 Oct. 31, 2013

(30) Foreign Application Priority Data

Apr. 27, 2012 (NL) .................................... 2008729

(51) Int. Cl.
*A22C 25/14* (2006.01)
*A22C 21/00* (2006.01)

(52) U.S. Cl.
CPC .................................. *A22C 21/0023* (2013.01)
USPC ........................................................ 452/167

(58) Field of Classification Search
USPC ........................... 452/125–127, 135, 136, 138
See application file for complete search history.

(56) References Cited

U.S. PATENT DOCUMENTS

| 4,639,975 | A | * | 2/1987 | van der Eerden | 452/167 |
| 5,176,563 | A | * | 1/1993 | van den Nieuwelaar et al. | 452/166 |
| 5,188,559 | A | * | 2/1993 | Hazenbroek | 452/167 |
| 6,322,438 | B1 | * | 11/2001 | Barendregt et al. | 452/167 |
| 6,558,243 | B2 | * | 5/2003 | Minemura et al. | 452/149 |
| 6,749,497 | B2 | * | 6/2004 | Haley et al. | 452/167 |
| 7,476,148 | B2 | * | 1/2009 | McQuillan et al. | 452/154 |
| 8,430,728 | B2 | * | 4/2013 | Hazenbroek | 452/169 |
| 2002/0155803 | A1 | | 10/2002 | Tieleman | |
| 2005/0059334 | A1 | | 3/2005 | Haley et al. | |

FOREIGN PATENT DOCUMENTS

EP 0 395 169 10/1990
EP 0 369 544 11/1993

OTHER PUBLICATIONS

Search report for NL 2008729, dated Jan. 10, 2013.

* cited by examiner

*Primary Examiner* — Richard Price, Jr.
(74) *Attorney, Agent, or Firm* — Dority & Manning, P.A.

(57) ABSTRACT

An exemplary apparatus is provided for processing a poultry carcass part that includes a back portion and two legs connected to the back portion wherein the legs are separated from the back portion. The exemplary apparatus includes a conveyor line with shackles for conveying a series of poultry carcass parts suspended from the shackles, and at least one cutting device for making an incision in the joints connecting the legs to the back portion, wherein a series of cutting devices are assembled at the outer circumference of a cylindrical processing machine which is rotatable around a central body axis.

17 Claims, 11 Drawing Sheets

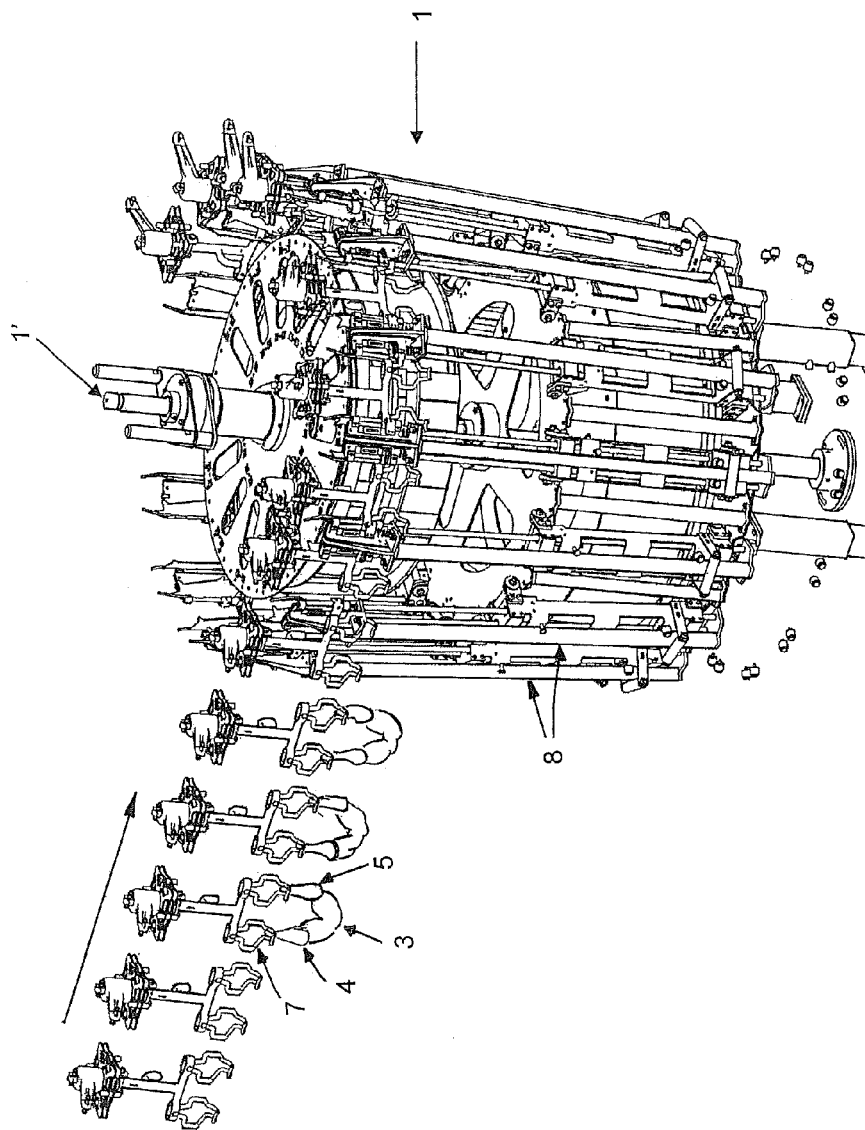

METHOD AND APPARATUS FOR PROCESSING A POULTRY CARCASS PART

FIELD OF THE INVENTION

The invention relates to a method and apparatus for processing a poultry carcass part that includes a back portion and two legs connected to the back portion wherein the legs can eventually be separated from the back portion.

BACKGROUND OF THE INVENTION

Throughout the years the industry has made efforts to increase the yield of meat on the legs that are separated from the back portion. By way of example, known apparatus for executing such method includes a conveyor line with shackles for conveying a series of poultry carcass parts suspended from the shackles, and at least one cutting device for making an incision in the joints connecting the legs to the back portion. After making the incision the legs can be torn loose from the back portion.

U.S. Pat. No. 4,639,975 (priority 1984) already had as objective to separate the leg with the oyster remaining on top thereof and not on the back part of the bird, which is less suitable for consumption. It applied leg guides and cutting knives attached to the guide edges.

EP-B-0 369 544 (priority 1988) provided better yield by improving the accuracy of the incision by gripping the back portion of the carcass by a gripping member proceeding in a closed conveyor loop at higher speeds than the overhead conveyor for the poultry carcasses, and by application of guide means to guide the back portion of the carcasses until after the back has been removed from the thighs.

U.S. Pat. No. 5,176,563 (priority 1990) worked on the incision. As a result of the groin incision, a large part of the tissue connections between body part and legs remain intact. It proposed to position the carcass part relative to the incision means and making a groin incision between the legs and the body part at the side of the legs facing the body part. Following that the legs were dislocated from the joints and pulled off the body part.

U.S. Pat. No. 5,188,559 (priority 1991) proposed to reliably and cleanly separate the backs from the legs of the poultry carcasses and leave the oysters of the joints attached to the separated ends of the thighbones. For this purpose a first pair of incisions were made at the locations of the thigh joints, the back portion of the carcass was rotated relative to the legs for dislodging the ball from the sockets of the thigh joints, and the back portion of the carcass was pulled away from the legs at the location of the thigh joints.

U.S. Pat. No. 6,322,438 (priority 1999) tried to improve the yield of meat on the legs by a more accurate guiding of the poultry carcasses to the cutters, which cut through the tissue extending between the thighs and the back portions of the carcasses.

US 2005/0059334 (priority 2003) improves the yield of the meat on the legs by a combination of hold down bars, guide members, blades, and plowing members to effect a yield value increase for the whole leg by increasing the amount of flesh and skin removed from the back portion and left attached to the upper thigh portion of the whole leg.

The picture that transpires from the prior art during the last decades is that the problem of improving the yield of meat on the leg that is separated from a back portion has remained unsolved, and this despite all the efforts that numerous inventors have spent during these decades to solve this problem. One apparent problem for increasing this yield of meat is the accuracy with which the incision can be made at the location of the joints connecting the legs to the back portion of the poultry carcass part.

SUMMARY OF THE INVENTION

It is therefore a first objective to improve the accuracy of the incision as discussed above. The second objective is to improve the yield of meat on the legs separated from the back portion of the poultry carcass part. The third objective is to improve the reliability by which the yield of meat on the legs can be enhanced. The fourth objective is to attain the aforesaid objectives whilst maintaining and preferably increasing the processing speed and capacity of the processing apparatus. These and other objectives and advantages are provided by an apparatus and method according to one or more of the appended claims.

In a first exemplary aspect of the invention, as apparatus is provided for processing a poultry carcass part that includes a back portion and two legs connected to the back portion wherein the legs are to be separated from the back portion. This exemplary apparatus includes a conveyor line with shackles for conveying a series of poultry carcass parts suspended from the shackles, and is provided with a series of cutting devices that are assembled at the outer circumference of a cylindrical processing machine, which is rotatable around a central body axis.

Contrary to the exemplary apparatus of the invention, all prior art machines are embodied as linear machines, which means machines in which the poultry carcass parts are conveyed linearly and processing of the poultry carcass parts is done by immovably positioned cutting devices. The cutting devices according to the prior art may either have fixed cutting edges or may be embodied as rotary knives, yet in all cases the poultry carcass parts are moving past these cutting devices. The consequence thereof is that the accuracy of making incisions at the joints of the legs is impaired by the natural variation in the dimensions of the passing poultry carcass parts. To accommodate for this, the conventional linear machines are in a way self-adjusting, but this provides another accuracy problem when two or more poultry carcass parts are processed simultaneously, which is indeed what happens in practice. Processing of one poultry carcass part adversely affects the accuracy of processing the other poultry carcass parts.

The exemplary apparatus of the invention differentiates from the prior art by providing for each poultry carcass part individual cutting devices that are provided at the outer circumference of a rotating cylindrical processing machine, which are operated on the poultry carcass parts while these poultry carcass parts move along the outer circumference of the cylindrical processing machine. This construction provides accuracy to the incision making and also enables high production rates.

Using a cylindrical processing machine with individual cutting devices for the poultry carcass parts that are to be processed provides the notable advantage that prior to the operation of any one of the cutting devices on a poultry carcass part, the shackles and the back portion of the concerning poultry carcass part can be individually fixed in position, avoiding interference between neighboring carcass parts that are being processed.

To promote the objectives of the invention, the exemplary cylindrical processing machine is preferably provided with a series of first fixing means for fixing the carcass back portions in position. Further it is desirable that the exemplary cylindrical processing machine is provided with a series of second fixing means for fixing the shackles in position.

In a further exemplary aspect of the invention, each of the first fixing means and/or second fixing means is accompanied by cutting devices whereby the cutting devices and the first fixing means and/or second cutting means are arranged to execute operations attuned to each other.

The exemplary apparatus of the invention can be suitably arranged such that the first fixing means includes a back rest and a hingeable portion that is movable to and fro the back rest wherein the back portion of the poultry carcass part can be clampingly received between the back rest and the hingeable portion.

Further, each of the second fixing means can be arranged to move the two branches of any shackle sideways apart from each other. In this way, it is possible that prior to the operation of any one of the cutting devices on a poultry carcass part, the legs of such poultry carcass part are moved sideways to dislocate the legs from the joints connecting the legs to the back portion.

For fixing the shackles in position, in one exemplary embodiment it is preferred that the branches of the shackles are provided with receptacles and that the second fixing means are embodied as movable with protrusions that are dimensioned to engage and fit into the receptacles.

The exemplary apparatus is further suitably embodied such that the cutting devices are movable up-and-down for providing an incision in the joints connecting the legs to the back portion. Preferably, in this exemplary embodiment, the up-and-down movement of the cutting devices is enabled after the shackles and the back portion of the poultry carcass part are fixed in position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the drawings below. Therein, the invention will hereinafter be further elucidated with reference to the drawing of an exemplary embodiment, which is non-limiting as to the appended claims.

In the drawings:

FIG. 1 shows an isometric view of a cylindrical processing machine as an exemplary embodiment of the invention;

Whenever in the figures the same reference numerals are applied, these numerals refer to the same parts.

DETAILED DESCRIPTION OF THE INVENTION

Figure 2A:
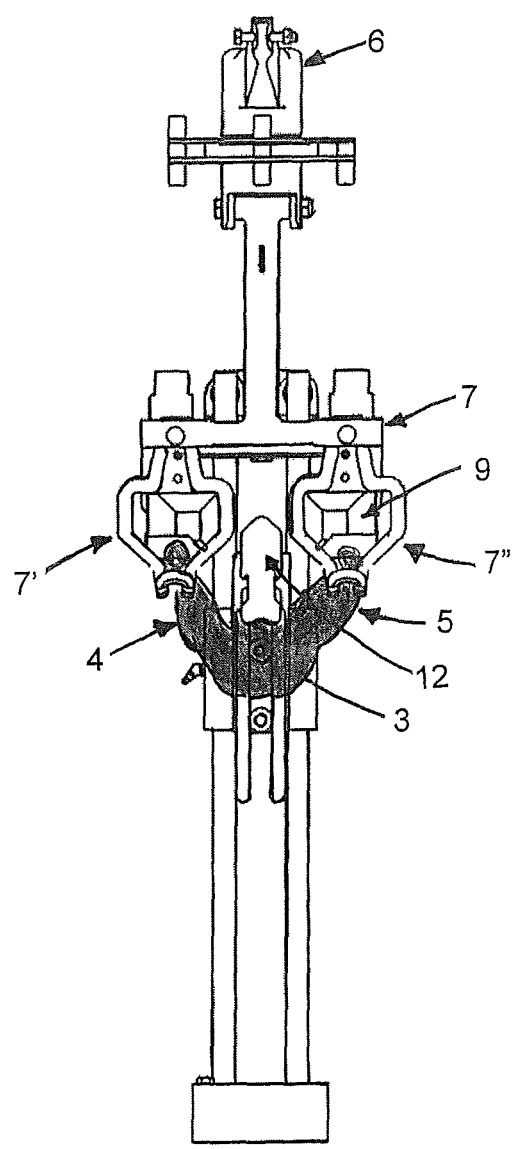
FIG. 2A/2B shows a frontal view and side view respectively of a poultry carcass part arriving at one of the cutting devices provided at the circumference of the exemplary cylindrical processing machine.
Figure 2B:
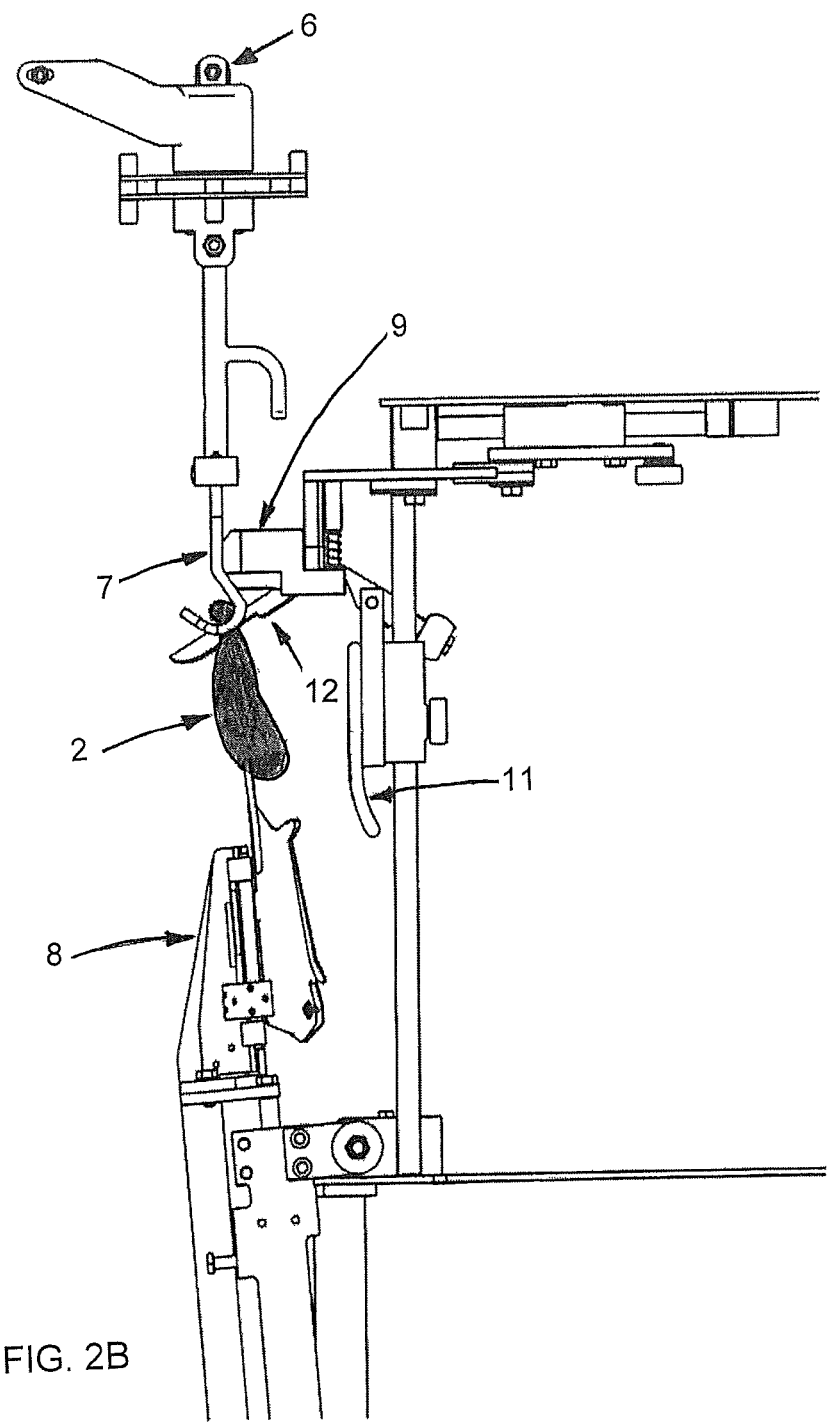

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

With reference first to FIG. 1 an exemplary apparatus 1 is shown for processing a poultry carcass part 2. The exemplary apparatus includes a back portion 3 and two legs 4, 5 connected to the back portion 3 for providing an incision between the legs 4, 5 and the back portion 3 for their eventual separation. The apparatus 1 includes a conveyor line 6 with shackles 7 for conveying a series of poultry carcass parts 2 suspended from the shackles 7, and at least one cutting device 8 for making an incision in the joints connecting the legs 4, 5 to the back portion 3. As the figure shows, the apparatus is embodied as a cylindrical processing machine 1 and a series of cutting devices are assembled at the outer circumference of this cylindrical processing machine 1, which is rotatable around a central body axis 1'.

As the FIGS. 2A/2B show, the cylindrical processing machine 1 is provided with a series of first fixing means 11, 12 for fixing the carcass back portions 3 in position and a series of second fixing means 9 for fixing the shackles 7, more in particular its branches 7', 7" and the legs 4, 5 suspended therefrom in position.

Figure 3A:
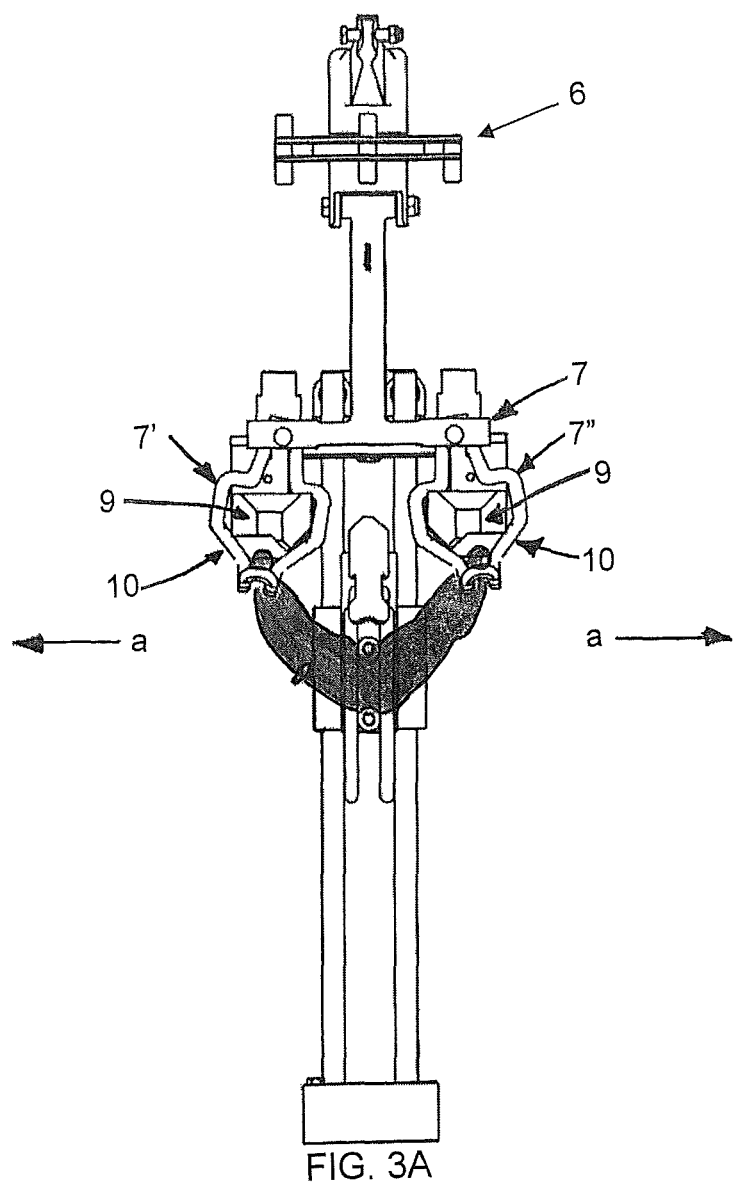
FIG. 3A/3B shows the fixing into position of the branches of a shackle in a frontal view and side view respectively.
Figure 3B:
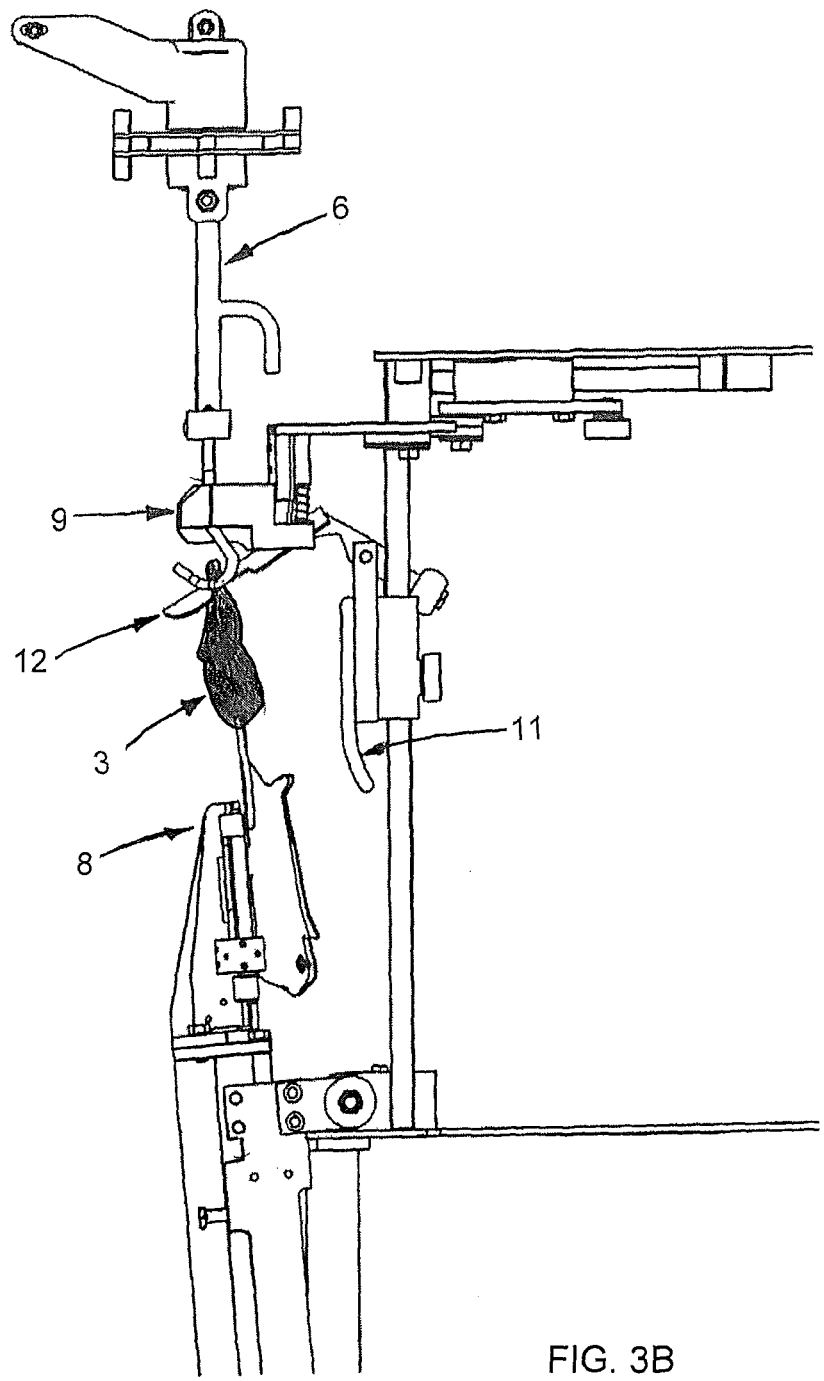

Turning now to FIG. 3A/3B, it is shown that after the arrival of the poultry carcass part 2 at the cylindrical processing machine 1, the second fixing means 9 is arranged to move the two branches 7', 7" of the shackle 7 of the poultry carcass part 2 in a direction sideways apart from each other as illustrated with arrows a. The FIGS. 3A/3B show that the branches 7', 7" of the shackles 7 are to this end provided with receptacles 10 and the second fixing means 9 are embodied as movable protrusions that are dimensioned to engage and fit into said receptacles 10. The sideways movement of the protrusions 9 taking with them the branches 7', 7" of the shackles 7 results in a corresponding sideways movement of the legs 4, 5 and causes the dislocation of the legs 4, 5 out of their corresponding joints that connect the legs to the back portion 3 of the poultry carcass part 2.

Figure 4A:
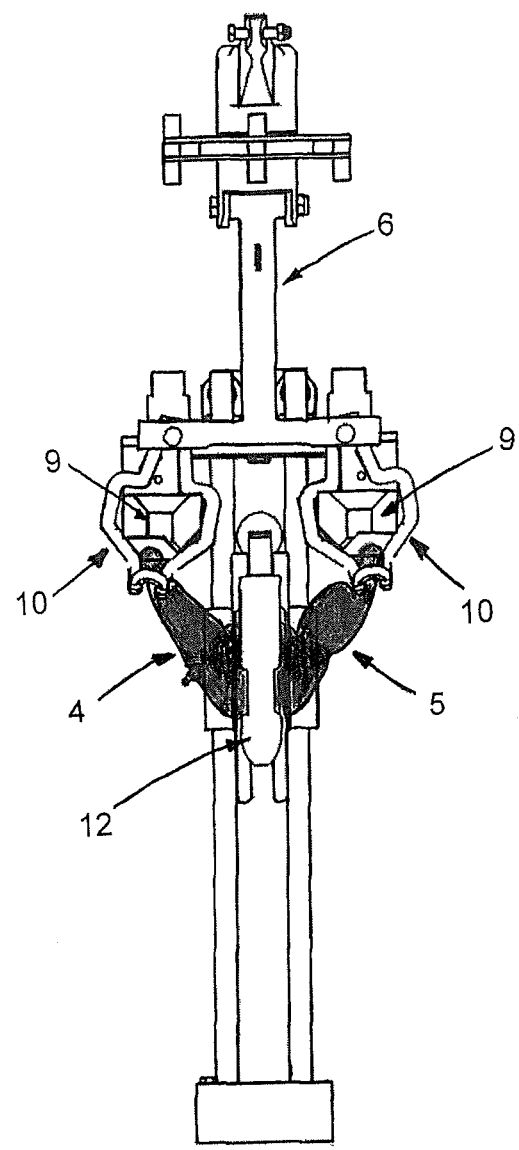
FIG. 4A/4B shows the fixing into position of the carcass back portion in a frontal view and side view respectively.
Figure 4B:
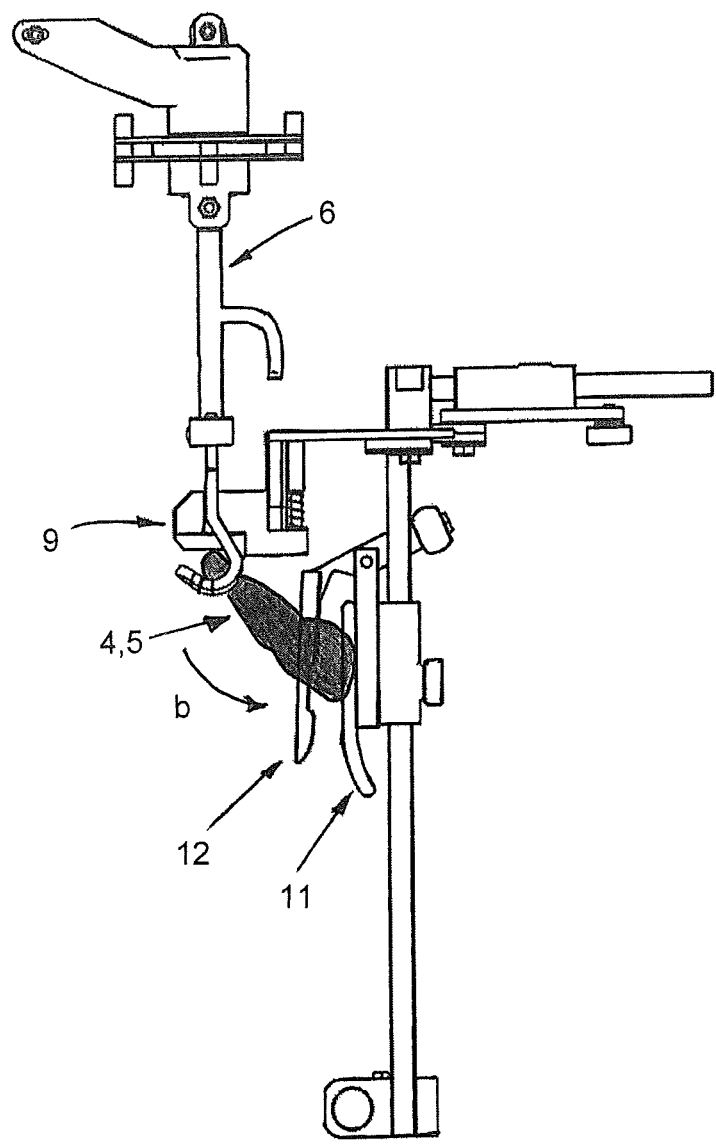

FIG. 4A/4B shows the situation after fixing of the branches 7', 7" of the shackle 7 into position, which is hereabove illustrated with reference to FIG. 3A/3B. Arrived at that point in the processing of the poultry carcass part 2, it is shown in FIG. 4A/4B that the first fixing means 11, 12 includes a back rest 11 and a hinge-able portion 12, which is movable to and fro the back rest 11, is operated so as to cause that the back portion 3 of the poultry carcass part 2 is clampingly received between the back rest 11 and the hingeable portion 12. Arrow b represents the movement of the hingeable portion 12 towards the back rest 11 to effectuate the clamping of the back portion 3 of the poultry carcass part 2. When the movement of the hingeable portion 12 has stopped and the back portion 3 is fixed in position, the cutting device 8 can become operational, which is shown in FIG. 5A/5B.

Figure 5A:
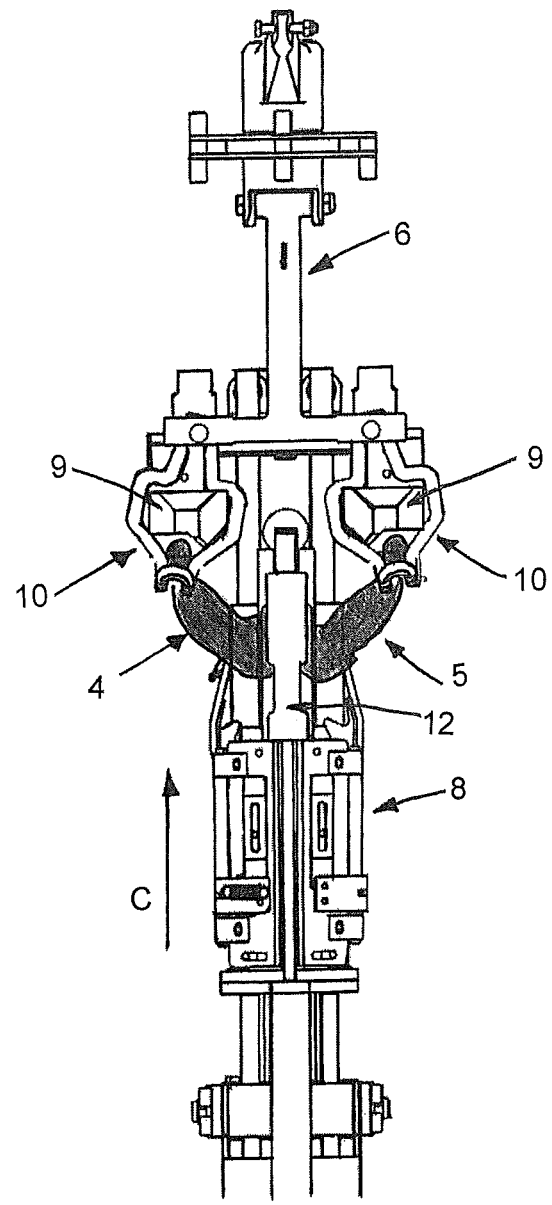
FIG. 5A/5B shows the upward movement of the cutting device after fixing of the shackle and the carcass back portion is complete in a frontal view and side view respectively.
Figure 5B:
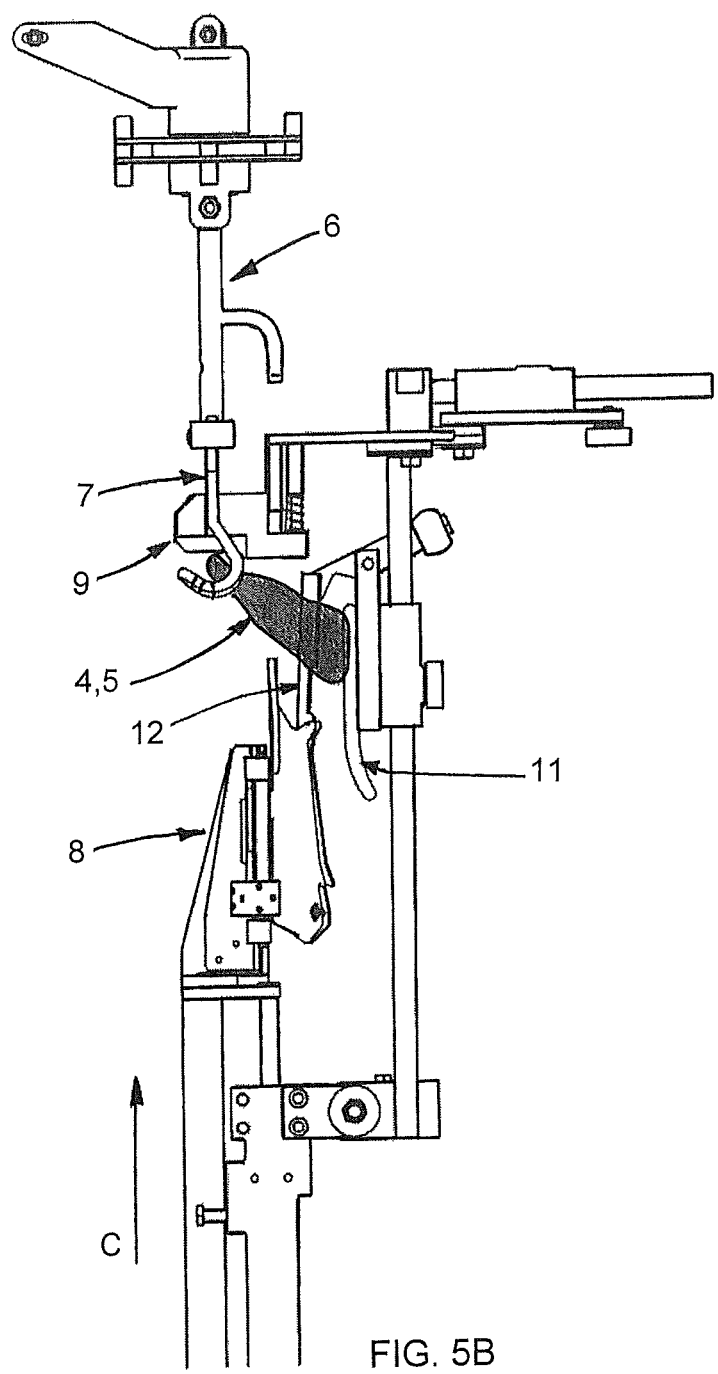
Figure 6A:
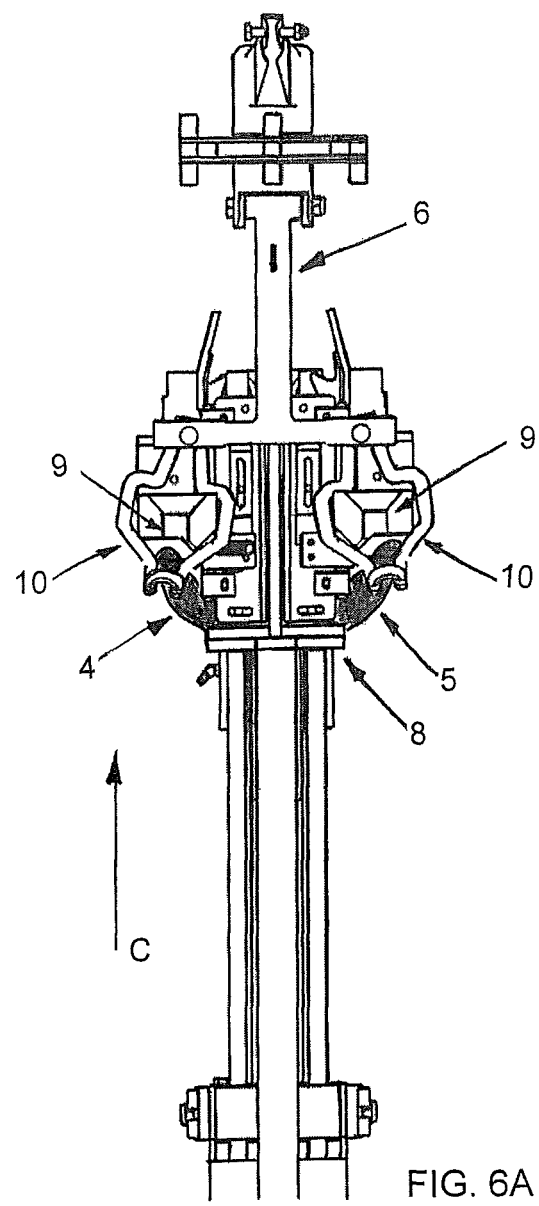
FIG. 6A/6B shows the cutting operation of the cutting device in a frontal view and side view respectively.
Figure 6B:
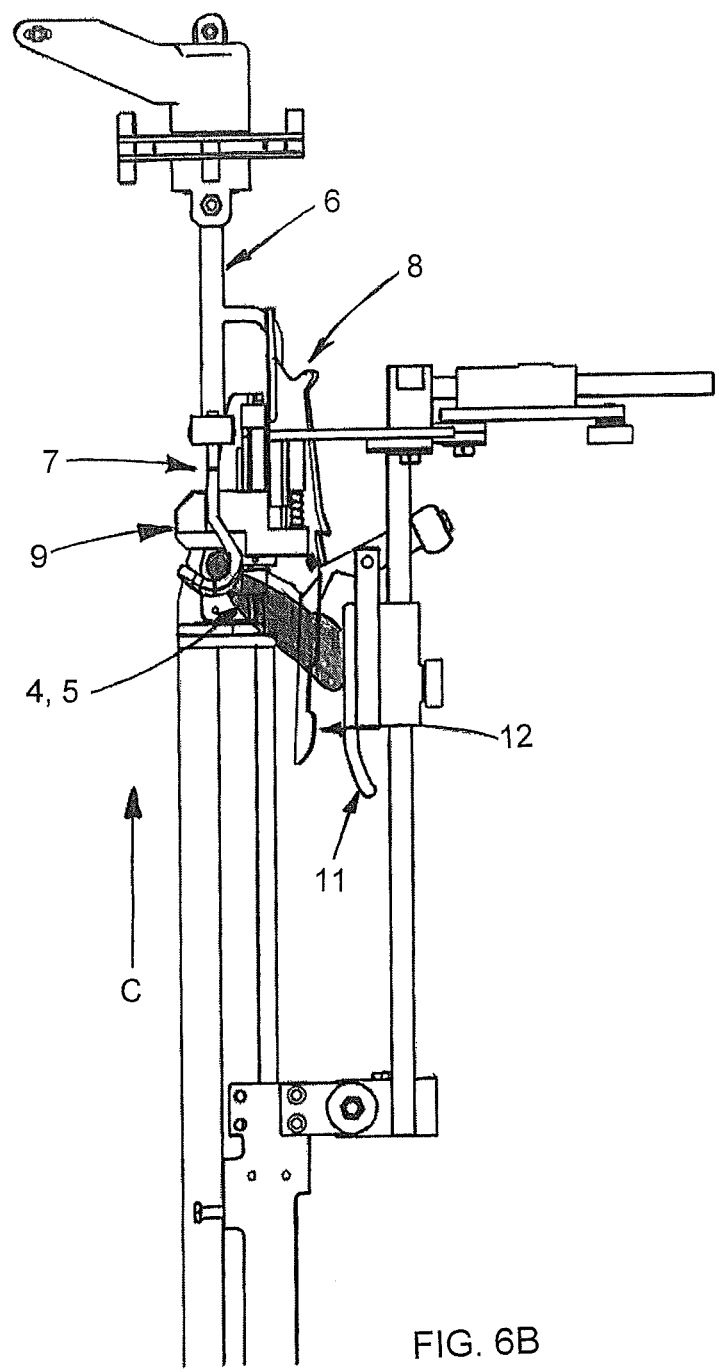

FIG. 5A/5B shows that the cutting device 8 is movable up-and-down, wherein the upward movement represented by arrow c is for providing an incision in the joints connecting the legs 4, 5 to the back portion 3. After the incision is made, which is shown in FIG. 6A/6B, the cutting device 8 may move down again. It is superfluous to show this downward movement in the figures, but the above discussion of the sequence of first fixing the branches 7', 7" of the shackle 7 at a position in which the legs 4, 5 are dislocated from the joints connecting the legs to the back portion 3, and the subsequent fixing of the back portion 3 illustrates that the cutting device 8 and the first fixing means 11, 12 and second fixing means 9 are arranged to execute operations attuned to each other. The up-and-down movement of the cutting device 8 is thus enabled after the shackles 7 and the back portion 3 of the poultry carcass part 2 are fixed in position.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. An apparatus for processing a poultry carcass part, the poultry carcass part including a back portion and two legs connected to the back portion wherein the legs can be separated from the back portion, the apparatus comprising:
    a conveyor line with shackles for conveying a series of poultry carcass parts suspended from the shackles;
    at least one cutting device for making an incision in the joints connecting the legs to the back portion;
    a cylindrical processing machine which is rotatable around a central body axis; and
    a series of cutting devices assembled at the outer circumference of the cylindrical processing machine.

2. An apparatus according to claim 1, wherein the cylindrical processing machine is provided with a series of first fixing means for fixing the carcass back portions in position.

3. An apparatus according to claim 2, wherein the first fixing means comprises a back rest and a hingeable portion that is movable to and fro the back rest, wherein the back portion of the poultry carcass part can be clampingly received between the back rest and the hingeable portion.

4. An apparatus according to claim 2, wherein the cylindrical processing machine is provided with a series of second fixing means for fixing the shackles in position.

5. An apparatus according to claim 4, wherein each shackle comprises two branches, and wherein each of the second fixing means is arranged to move the two branches of any shackle sideways apart from each other.

6. An apparatus according to claim 5, wherein the branches of the shackles are provided with receptacles and the second fixing means are embodied as movable protrusions that are dimensioned to engage and fit into the receptacles.

7. An apparatus according 6, wherein each of the first fixing means and/or second fixing means is accompanied by at least one of the series of cutting devices, and wherein the cutting devices and the first fixing means, the second fixing means, or both are arranged to execute operations attuned to each other.

8. An apparatus according to claim 7, wherein the series of cutting devices are movable up-and-down for providing an incision in the joints connecting the legs to the back portion.

9. An apparatus according to claim 8, wherein the up-and-down movement of the series of cutting devices is enabled after the shackles and the back portion of the poultry carcass part are fixed in position.

10. A method for processing a poultry carcass part, the poultry part including a back portion and two legs connected to the back portion, the method comprising the steps of:
    suspending a series of poultry carcass parts from shackles that are conveyed in a conveyor line; and
    operating at least one cutting device of a series of cutting devices to make incisions in the joints connecting the legs to the back portion, wherein the series of cutting devices are provided at the outer circumference of a rotating cylindrical processing machine and operate on the poultry carcass parts while the poultry carcass parts move along the outer circumference of the cylindrical processing machine.

11. The method according to claim 10, further comprising the step of:
    fixing in position the shackles and the back portion of the poultry carcass parts prior to the step of operating.

12. The method according to claim 11, wherein each shackle comprises two branches, each branch provided with a receptacle, and wherein said step of fixing in position the shackles comprises engaging and fitting movable protrusions of the cylindrical processing machine into the receptacles.

13. The method according to claim 11, wherein the step of fixing in position the back portion of the poultry carcass parts comprises receiving the back portion of each poultry carcass part between a back rest and a hingeable portion of the cylindrical processing machine.

14. The method according to claim 10, further comprising the step of:
    moving the legs of the poultry carcass part sideways, prior to the step of operating, so as to dislocate the legs from the joints connecting the legs to the back portion.

15. The method according to claim 10, wherein the step of operating comprises moving the at least one cutting device up and down to make incisions in the joints connecting the legs to the back portion.

16. The method according to claim 10, wherein each shackle comprises two branches, and wherein the step of suspending comprises suspending each leg of a poultry carcass part from a branch of a shackle.

17. The method according to claim 10, wherein said cylindrical processing machine rotates about a central body axis.

* * * * *